United States Patent
Yeow et al.

(10) Patent No.: US 10,396,414 B2
(45) Date of Patent: Aug. 27, 2019

(54) HIGH POWER BATTERY CELLS HAVING IMPROVED COOLING

(71) Applicant: AVL Powertrain Engineering, Inc., Plymouth, MI (US)

(72) Inventors: Kim F. Yeow, Ann Arbor, MI (US); Ho Teng, Canton, MI (US)

(73) Assignee: AVL Powertrain Engineering, Inc., Plymouth, MI (US)

( * ) Notice: Subject to any disclaimer, the term of this patent is extended or adjusted under 35 U.S.C. 154(b) by 504 days.

(21) Appl. No.: 14/424,815

(22) PCT Filed: Aug. 29, 2013

(86) PCT No.: PCT/US2013/057236
§ 371 (c)(1),
(2) Date: Feb. 27, 2015

(87) PCT Pub. No.: WO2014/036227
PCT Pub. Date: Mar. 6, 2014

(65) Prior Publication Data
US 2015/0214586 A1    Jul. 30, 2015

Related U.S. Application Data

(60) Provisional application No. 61/695,558, filed on Aug. 31, 2012.

(51) Int. Cl.
| | |
|---|---|
| H01M 10/00 | (2006.01) |
| H01M 10/6556 | (2014.01) |
| H01M 10/625 | (2014.01) |
| H01M 10/647 | (2014.01) |
| H01M 10/6555 | (2014.01) |
| H01M 10/613 | (2014.01) |

(52) U.S. Cl.
CPC ..... *H01M 10/6556* (2015.04); *H01M 10/613* (2015.04); *H01M 10/625* (2015.04); *H01M 10/647* (2015.04); *H01M 10/6555* (2015.04); *H01M 2220/20* (2013.01)

(58) Field of Classification Search
CPC ........... H01M 2220/20; H01M 10/613; H01M 10/625; H01M 10/647; H01M 10/6555; H01M 10/6556
USPC ....................................................... 429/120
See application file for complete search history.

(56) References Cited

U.S. PATENT DOCUMENTS

| | | |
|---|---|---|
| 5,034,290 A | 7/1991 | Sands et al. |
| 2007/0090519 A1 | 4/2007 | Carter et al. |
| 2008/0066676 A1 | 3/2008 | Mariner et al. |
| 2010/0279154 A1 | 11/2010 | Koetting et al. |

(Continued)

OTHER PUBLICATIONS

Teng, Ho et al., Design of Direct and Indirect Liquid Cooling Systems for High-Capacity, High-Power Lithium-Ion Battery Packs. SAE International. vol. 1. Issue 2. (Dec. 2012) pp. 525-536.

(Continued)

*Primary Examiner* — Nicholas P D'Aniello
*Assistant Examiner* — Abibatu O Ojo-Amoo

(57) ABSTRACT

A thermal management system for a battery pack having at least one battery cell is provided. The thermal management system may include a cooling plate disposed adjacent to the at least one battery cell. The cooling plate may include thermal pyrolytic graphite (TPG) to dissipate heat away from the at least one battery cell.

21 Claims, 5 Drawing Sheets

(56) References Cited

U.S. PATENT DOCUMENTS

2011/0059347 A1 3/2011 Lee et al.
2011/0274957 A1* 11/2011 Chen .................. B32B 15/04
　　　　　　　　　　　　　　　　　　　　　429/120
2011/0300428 A1* 12/2011 Sohn ................... H01M 2/1066
　　　　　　　　　　　　　　　　　　　　　429/120

OTHER PUBLICATIONS

International Search Report and Written Opinion for PCT/US2013/057236, dated Nov. 6, 2013; ISA/KR.

* cited by examiner

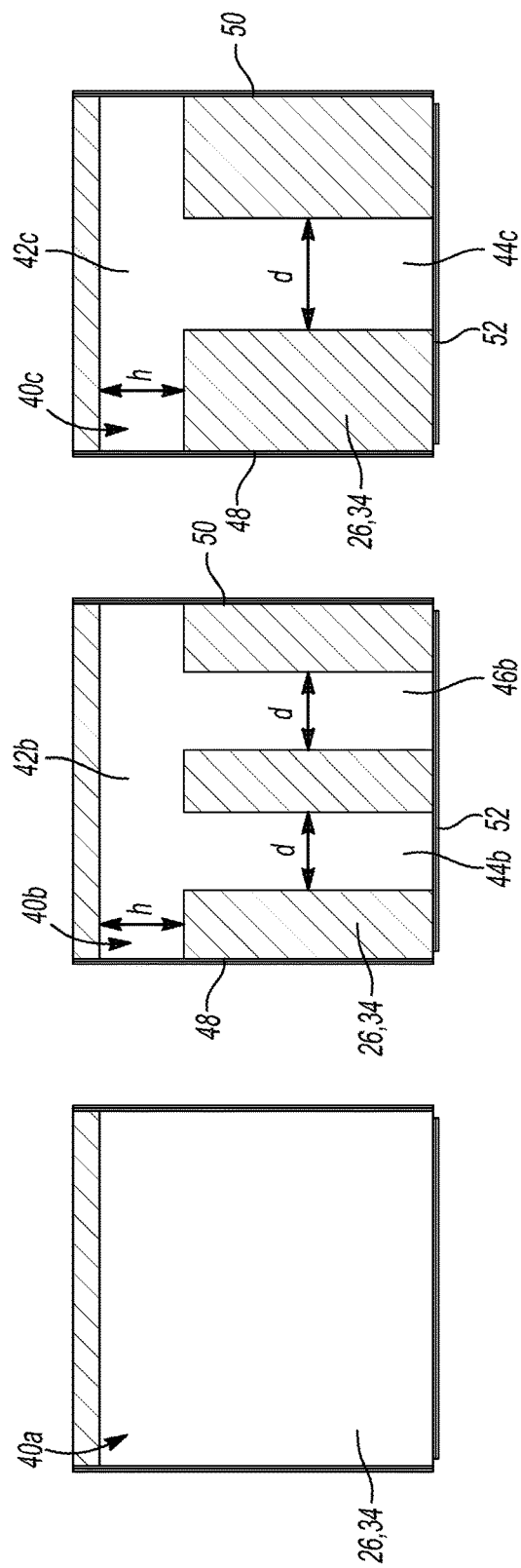

HIGH POWER BATTERY CELLS HAVING IMPROVED COOLING

CROSS-REFERENCE TO RELATED APPLICATIONS

This application claims the benefit of U.S. Provisional Application No. 61/695,558, filed on Aug. 31, 2012. The entire disclosure of the above application is incorporated herein by reference.

FIELD

The present disclosure relates to battery packs and more particularly to a thermal management system for a battery pack.

BACKGROUND

This section provides background information related to the present disclosure which is not necessarily prior art.

Lithium-ion (Li-ion) battery packs for plug-in hybrid electrical vehicle (PHEV) applications are often assembled with high-capacity, high-power pouch cells. The PHEV battery packs have two operation modes: a charge-depleting or electrical-vehicle (EV) mode and a charge-sustaining or HEV mode. The pack capacity and power are determined by the range and maximum power required by the vehicle in the EV mode.

During the EV mode operations, the state of charge (SOC) of the battery cells typically drops from 90 percent to 25 percent (i.e., the usable capacity ΔSOC=65 percent). The EV-mode electrical energy consumption falls in a range of 300–400 Wh/mile for most passenger cars and light-duty (LD) trucks. For a PHEV with 400-Wh/mile energy consumption and a 40-mile EV range, the required nominal capacity for the battery pack would be 25 kWh.

PHEV battery packs operate at their full capacities only in the EV mode because the vehicle is powered solely by the battery pack in this mode. Because the pack duties are much greater in the EV-mode than those in the HEV mode (the pack functions only for power assistance as in a full-hybrid vehicle), the heaviest thermal load for a PHEV pack is encountered at the end of the EV mode.

The maximum cell temperature ($\Delta T_{cell,max}$) and the maximum differential cell temperature ($\Delta T_{cell,max}$) are important factors to the cell durability. For high-capacity and high-power Li-ion pouch cells, the criteria for the battery cooling system design are often set as $T_{cell,max} \leq 55°$ C. and $\Delta T_{cell,max} < 8°$ C. In order to minimize the number of battery cells in the pack, the battery cells in PHEV packs are generally much larger than those in HEV packs in both capacity and size.

The highest or maximum cell temperature is usually located near the terminal tab region where the highest local current densities are encountered. During continuous discharge with high cell currents in the EV mode operations, the ohmic heat generated in the tabs/busbars can have significant influence on the local cell temperatures near the tabs. Hence, cooling of a PHEV pack often involves not only dissipating the heat generated in the cells but also the ohmic heat generated at the tabs/busbars, which presents a challenge in designing thermal management systems for cooling large-pouch cells in PHEV battery packs.

SUMMARY

This section provides a general summary of the disclosure, and is not a comprehensive disclosure of its full scope or all of its features.

A thermal management system for a battery pack having at least one battery cell is provided. The thermal management system may include a cooling plate disposed adjacent to the at least one battery cell. The cooling plate may include thermal pyrolytic graphite (TPG) to dissipate heat away from the at least one battery cell.

In one configuration, the cooling plate is provided for cooling large-size pouch cells with indirect liquid cooling for a battery system used in PHEV applications. The PHEV battery pack may be used in LD truck applications, for example, and may include eight (8) identical modules connected in a 96S1P configuration. Each module may be stacked with twelve 70 Ah high-power pouch Li-ion battery cells having a nominal voltage of 3.7V, an internal resistance less than 0.7 mΩ, a maximum discharge rate of 10 C, operating temperatures between −15° C. and 60° C., a mass of 1450 grams, and dimensions of approximately 11 mm×248 mm×260 mm (T*W*H).

Because all of the cells in the battery pack are connected in series, the pack has a nominal capacity of 24.9 kWh. If the useable SOC range is assumed to be ΔSOC=65 percent (from 90 percent to 25 percent) and the EV-mode energy consumption to be 400 Wh/mile, the pack EV range is potentially up to approximately 40 miles. The temperatures of the cells in the battery pack may be managed with an indirect liquid cooling system (FIGS. 1 and 2). The cells in each module may be cooled indirectly with a liquid-cooled cold plate (hereafter "cold plate") attached to the battery pack or module. The coolant flows to the cold plates are assumed to be in parallel, making all modules thermally symmetric in an ideal condition. Thus, only a representative module is provided to illustrate the thermal behavior of the cells in the pack.

According to another particular aspect, the present disclosure provides a method for cooling a battery pack having at least one battery cell. The method includes positioning a cooling plate adjacent to the battery cell, whereby the cooling plate includes a thermal pyrolytic graphite (TPG) portion. The method also includes positioning at least one cold plate adjacent and substantially perpendicular to the cooling plate and circulating a fluid through the at least one cold plate. The method additionally includes (i) transferring heat from the at least one battery cell to the cooling plate, (ii) dissipating the heat through the TPG portion and (iii) transferring the heat from the cooling plate to the at least one cold plate.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 10A-C are schematic representations of cooling plates incorporating embedded thermal pyrolytic graphite (TPG);

Corresponding reference numerals indicate corresponding parts throughout the several views of the drawings.

DETAILED DESCRIPTION

Figure 1:
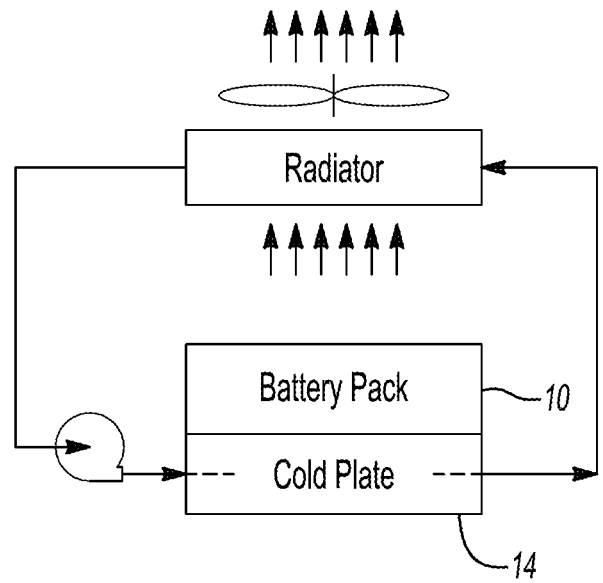
FIG. 1 is a schematic representation of an indirect liquid cooling system incorporating a single cold plate for use in cooling a battery pack.
Figure 2:
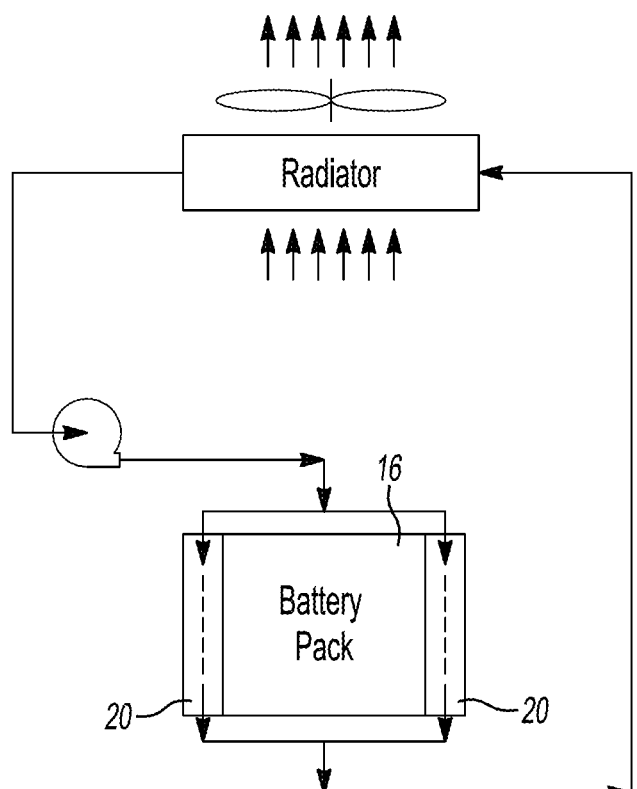
FIG. 2 is a schematic representation of an indirect liquid cooling system incorporating a pair of cold plates for use in cooling a battery pack.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 3:
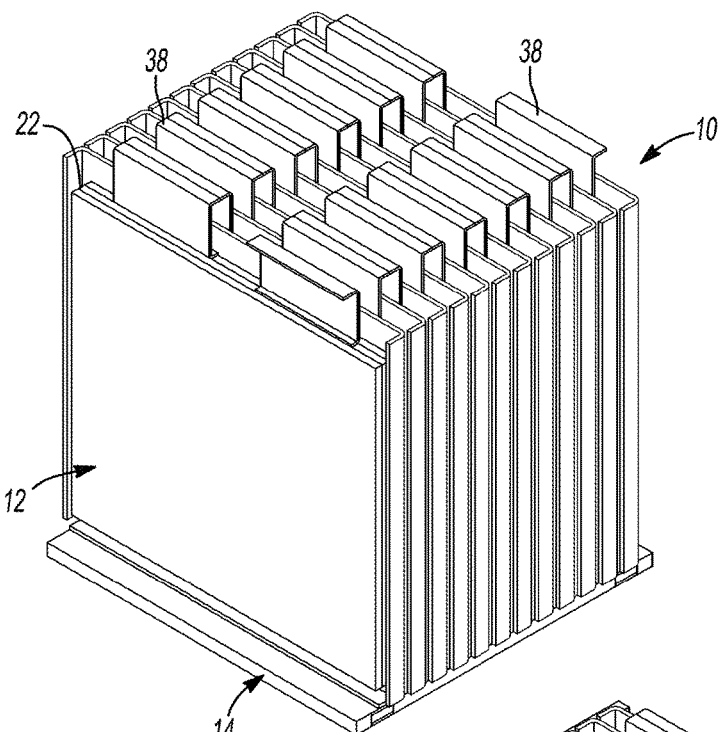
FIG. 3 is a perspective view of a battery pack incorporating a cold plate.
Figure 4:
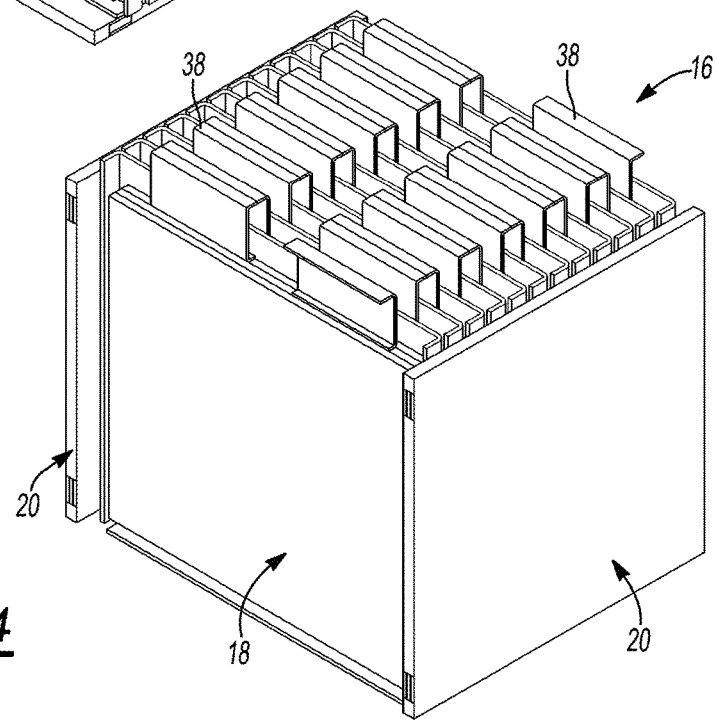
FIG. 4 is a perspective view of a battery pack incorporating a pair of cold plates.

FIG. 3 illustrates a battery module 10 incorporating a thermal management system 12 having a single cold plate 14. Likewise, FIG. 4 illustrates a battery module 16 incorporating a thermal management system 18 having a pair of cold plates 20. The cold plates 14, 20 may be of the type described and shown in SAE Paper No. 2012-01-2017, 2012 (now published as SAE Paper No. 2013-01-0234), the disclosure of which is incorporated herein by reference, and may include an array or other configuration of cooling passages 23 therein (FIGS. 6 and 7).

Figure 6:
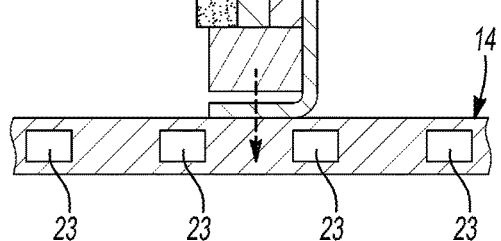
FIG. 6 is a partial cross-sectional view of a portion of the battery pack of FIG. 3.
Figure 7:
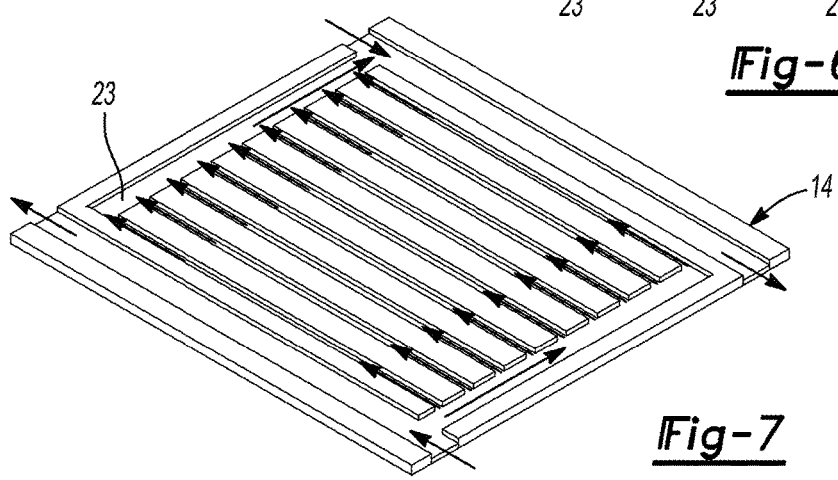
FIG. 7 is a cross-sectional view of the cold plate of FIG. 3.

FIG. 6 shows a basic cooling unit 22 in the battery module 10. Each cooling unit 22 may include a battery cell 24, an aluminum cooling plate 26, and an elastomeric thermal pad 28. Each battery cell 24 may include a pair of terminal tabs 38 extending from a side of the battery cell 24 opposite the cold plate 14 (FIG. 3). The 1.5-mm thick aluminum cooling plate 26 may be in contact with the liquid-cooled cold plate 14, through which the cell heat is dissipated into the coolant (assuming 50/50 ethylene glycol-water mixture). A side surface of the cell 24 not in contact with the cooling plate 26 may be thermally insulated from the adjacent cooling unit 22 by the elastomeric thermal pad 28. In one configuration, the cooling plates 26 and the cold plate 14 are in perfect contact such that the contact thermal resistance is negligible in comparison to that due to heat conduction along the cooling plates 26.

Figure 8:
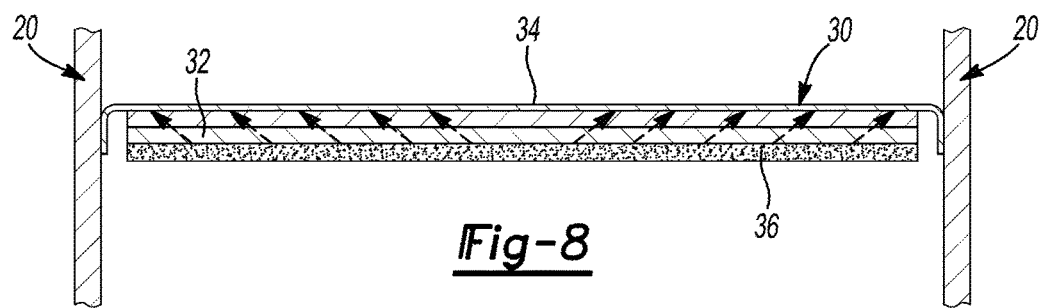
FIG. 8 is a partial cross-sectional view of the battery pack of FIG. 4.

The battery module 16 may also include a series of cooling units 30 (FIG. 8), each having a battery cell 32, an aluminum cooling plate 34, and a thermal pad 36. As with the cooling units 22, the cooling units 30 may dissipate heat generated by operation of the battery cell 32 into the coolant circulating within each of the cold plates 20. Operation of the cooling unit 30 is virtually identical to operation of the cooling unit 22, with the exception that the cooling unit 30 is in contact with a pair of cold plates 20 (FIG. 8). Further, because the cooling units 30 are in contact with a pair of cold plates 20, the cold plates 20 may be disposed on side surfaces of each cooling unit 30 (FIGS. 4 and 9) rather than being in contact with a bottom surface of each cooling unit 22 (FIGS. 3 and 6).

Regardless of whether the battery pack includes a single cold plate 14 or a pair of cold plates 20, during the EV-mode operations, the battery module 10, 16 can experience high-discharge/regeneration, high-pulse currents. These high-pulse and high-frequency discharge/charge activities generate a considerable amount of heat within the battery cells 24, 32, resulting in high temperatures within each cell 24, 32 and high temperature differences across the surfaces of each cell 24, 32.

Generally speaking, the larger the size of the cell 24, 32, the lower the allowable temperature differential for the cell 24, 32. In a battery system with indirect liquid cooling, the temperature differential for each cell 24, 32 is governed by the heat transfer capability of the cooling plate 26, 34. The cooling plate 26, 34 may be designed such that the temperature differences across the surfaces of the cell 24, 32 are proportional to the heat to be transferred by and through the cell 24, 32. The greater the amount of heat generated by the cell 24, 32, the larger the temperature gradient along the cooling plate 26, 34 and the larger the differential temperature across the surfaces of the cell 24, 32.

When the cell heat generation of the cell 24 becomes too high, the criterion for the maximum temperature differential for the cell 24 may not be met by using a single cold plate 14, due to the limit of the heat transfer capability for the given design of the cooling plate 26. In such case, there might be a need to cool the cell with dual cold plates 20 (FIG. 4), for which the resistance to heat transfer in the cooling plate 34 can be reduced by 50 percent as compared to cooling plate 26 and, therefore, the temperature differential for the cell 32 can be reduced significantly as compared to cell 24. However, dual cold-plate cooling complicates the overall design (FIG. 4), increases the parasitic mass of the cooling system, and reduces the gravimetric energy density of the battery system.

An alternative approach for reducing the maximum temperature of the cell 24 and the maximum temperature differential for the cell 24 is to improve the heat spreading and dissipating capability of the cooling plate 26 with strategically incorporated high thermal conductivity heat spreaders 40a, 40b, 40c. The heat spreaders 40a, 40b, 40c could be used with a single cold plate 14 (FIG. 3) or with a pair of cold plates 20 (FIG. 4), and may improve the uniformity of the temperature distribution across the cell 24, 32.

A cooling plate 26, 34 including a heat spreader 40a, 40b, 40c may consist of a 1.5 mm aluminum base plate with strategically incorporated heat spreaders (≤0.5 mm thick) made of thermal pyrolytic graphite (TPG). TPG has a low density (=2.26 g/cc) and an ultra-high in-plane thermal conductivity (~1700 W/m·K). As such, the cooling plate 26, 34 can rapidly conduct, spread, and dissipate cell heat to the cooling medium circulating in the cold plates 14, 20 of the particular system 12, 18. Further, the addition of a heat spreader 40a, 40b, 40c improves the uniformity of the temperature distribution across the cell 24, 32, reduces the maximum temperature of the cell 24, 32, and reduces the maximum temperature differential of the cell 24, 32. Accordingly, the heat spreader 40a, 40b, 40c improves the durability of the battery pack consisting of module 10, 16. Use of TPG in the heat spreader 40a, 40b, 40c may also eliminate the need to cool the cell terminal tabs 38 and busbars (not shown) with a separate cooling system.

FIGS. 10A-B show cooling plates 26, 34 with respective heat spreaders 40a, 40b, 40c embedded therein to enhance the cooling capability of the cooling plates. Namely, FIG. 10A shows a heat spreader 40a that covers the entire surface of the cooling plate 26, 34 that is in contact with the cell 24, 32, FIG. 10B shows a substantially Π-shape heat spreader 40b, and FIG. 10C shows a substantially T-shape heat spreader 40c. In all the three configurations, the overall thickness of the cooling plate 26, 34 is approximately 1.5 mm and the thickness of the heat spreaders 40a, 40b, 40c embedded in the cooling plates 26, 34 is approximately 0.5 mm (i.e., the thickness of the aluminum base to support the TPG heat spreaders 40a, 40b, 40c is approximately 1 mm).

The Π-shape heat spreader 40b may include a header 42b and first and second legs 44b, 46b. The header 42b may extend linearly from a first side 48 of the cooling plate 26, 34 to a second side 50 of the cooling plate 26, 34. The first and second legs 44b, 46b may extend linearly and substantially perpendicularly from the header 42b to a third side 52 of the cooling plate 26, 34.

Figure 5:
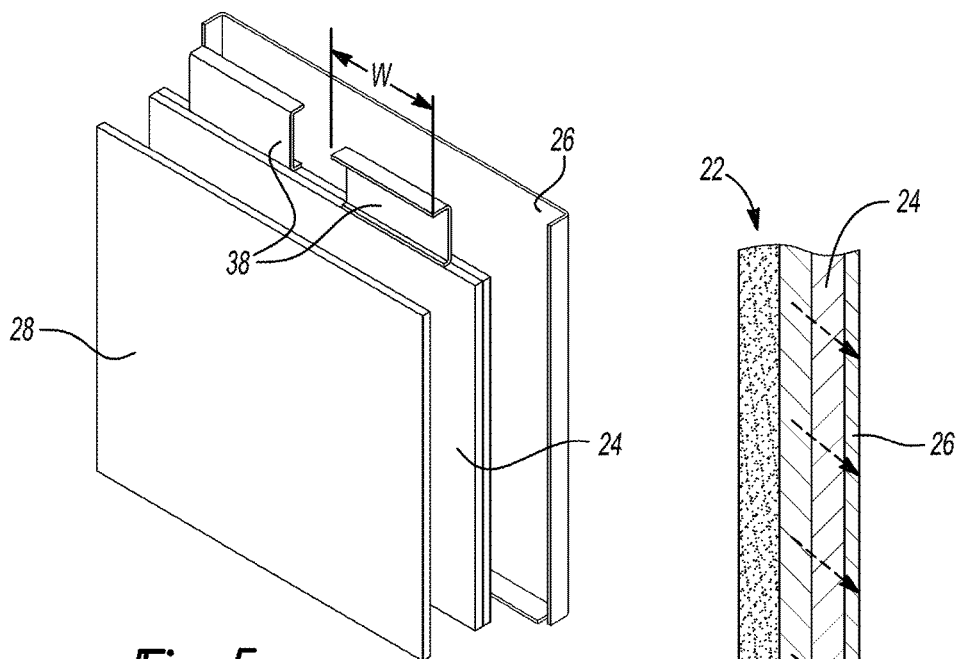
FIG. 5 is an exploded view of a portion of the battery pack of FIG. 3.

The T-shaped heat spreader 40c (FIG. 10C) may include a header 42c and a leg 44c. The header 42c may extend linearly from the first side 48 of the cooling plate 26, 34 to the second side 50 of the cooling plate. The leg 44c may extend linearly and substantially perpendicularly from the header 42c to the third side 52 of the cooling plate 26, 34. The dimensions h and d of the header and legs of the heat spreaders 40b, 40c can be optimized according to the cell heat flux distributions and the dimensions w of the terminal tabs 38. For example, the height h and width d may be approximately the same as the width w of the cell terminal tabs 38 (FIG. 5).

In one configuration, the simulated transient currents for the battery pack with module 10 under a user specified cycle for a target vehicle such as a light-duty (LD) truck may be equal to the cell current. Further, because the effective thermal mass for each cooling unit 22 includes the contributions from the cell 24, the cooling plate 26, and the elastomeric thermal pad 28, the battery system can tolerate electrical overloading for a short duration. Thus, the battery thermal load is evaluated on an $I^2\tau$ basis as $$I_\tau = \sqrt{(\int_\tau i^2 dt)/\tau} \qquad (1)$$

where $I\tau$ is a root-mean-square (rms) average current over a window time $\tau$ (i.e., the $I^2\tau$ current) and i is the transient current. Because $\tau$ is a moving window, $I\tau = I\tau$ (t) is a transient current in a thermal load sense, with the thermal history up to $\tau$ being considered. The variable $\tau$ is taken to be 120 seconds considering the relatively large thermal mass associated with the cell 24 in each cooling unit 22. An equivalent continuous cycle current $I_C$ can be defined as the average of the $I^2\tau$ current over the cycle time $\tau_C$ as $$I_C = (I_{\tau_C} \times dt)/\tau_C \qquad (2)$$

The $I^2\tau$ current and the averaged cycle current are always positive, and their values are much lower than those of the transient current. The maximum values for the $I^2\tau$ current $I\tau$ and the cycle average current $I_C$ are, respectively, $I_{t,max}$=291 A (equivalent to 4.2 C rate) and $I_C$=210 A (equivalent to 3 C rate). Because the heat generation is proportional to $I^2$, the $I^2\tau$ current characterizes the transient battery thermal load and the averaged cycle current characterizes the equivalent continuous battery thermal load.

Volumetric heat generation in a Li-ion cell q can be approximated with $$q = I^2 \times R_i \qquad (3)$$

where I is the current density and $R_i$ is the internal resistance which varies with temperature and depth of discharge (DOD=1−SOC). Lithium-ion cells are structured with multiple thin battery layers arranged in parallel in the cell 24. The layered cell structure is simplified with a continuous medium and the cell may be modeled as an equivalent heterogeneous solid medium where heat conduction takes place. Changes in the cell temperatures due to the cell heat can be characterized with energy balance on a unit cell volume as $$\rho C_p \frac{\partial T}{\partial t} = \nabla \cdot (k \nabla T) + q \qquad (4)$$

where $\rho$, $C_p$ and k are the local density, heat capacity and thermal conductivity of the cell medium, T is the temperature and t is the time. Thermal properties involved in the foregoing equations should be characterized with the composite properties for the cell. Considering that the temperature gradient across the thickness of a pouch cell is small, simplifying the cell 24 to consist of only a single battery layer as shown in FIG. 6 is sufficient to characterize the thermal behavior of the cell 24.

The equivalent continuous cell current (3 C rate or 210 A) corresponding to the user-specified cycle will be used to estimate the heat generated by the cell 24 in evaluations of the thermal behavior of the battery module 10. The electro-thermal behavior of the cells 24 in the battery module 10 under the specified load may be analyzed using ABAQUS, a widely used commercial FEA tool.

In order to gain confidence in evaluating the performances of the composite cooling plates 26, 34, a 3-cell mini module cooled with a single cold plate 14 was built and tested. The simulation model was modified to match the test conditions (e.g., the actual cell and cooling unit geometries, terminal connections and cooling condition in the test setup). The measurements were conducted only for the middle cell in the mini module because it was least influenced by the thermal boundary conditions applied to the cells 24 in the test. Fifteen (15) thermocouples were placed on the thermal pad side cell surface. During the test, the mini module was thermally insulated so that the heat generated in the 3-cell mini module was dissipated mainly through the cold plate 14. The test was conducted under a constant 2 C discharge rate from a fully charged condition (DOD=0) to 90 percent depth of discharge (DOD=0.9) with the cold plate surface temperature being maintained at 25° C.

A comparison of the simulated and measured cell temperatures may show a good correlation particularly across the middle half of the cell 24, where the cell temperatures were weakly influenced by the cell terminal tab 38 condition and the cooling condition of the cold plate 14 in the test. The temperatures for the upper quarter of the cell 24 were strongly influenced by the cell terminal tab 38 condition and hence the correlations at these locations are not as good as those across the middle half of the cell 24. For the terminal tabs temperatures, the model predictions are 1° C. lower than the measurements throughout the DOD range.

The connections between the current collectors for the multiple parallel thin battery layers and the terminal tabs 38 could not be modeled accurately due to lack of the geometric details inside of the cells. This multilayer connection generates considerable electrical contact resistances and thus additional ohmic heat in the terminal tabs and higher thermal contact resistance that impedes heat transfer. The simulated terminal tab temperatures agree well with the measurements in variations of the tab temperatures with changes in DOD during cell discharge.

The accuracy in predictions for the lower quarter of the cell 24 is also not as good as that for the middle half of the cell 24, where the cell temperatures are strongly influenced by the thermal boundary condition at the interface of the cooling plates 26 and the cold plate 14. The model assumed perfect contact between the aluminum cooling plates 26 and the cold plate 14 surface and applied a constant temperature at the interface between the cooling plates 26 and the cold plate 14. The cold plate surface temperature was not constant during the test and the fluctuations were due to the on/off activities of the temperature controller. This explains the difference between the tested cold plate surface temperatures and the boundary conditions applied to the cold plate 14 in the simulations. Overall, the predicted and the measured cell temperatures are closely correlated.

The model for the battery system with module 10 was presented in FIG. 3. A similar model could be used in conjunction with the battery pack with module 16 and thermal management system 18 shown in FIG. 4. All of the simulations were conducted under a constant 3 C (=210 A) discharge rate (corresponding to the equivalent continuous battery thermal load) from a fully charged state to 80 percent depth of discharge (DOD=0.8). This range of the cell utilizations covers the EV-mode operation for the target vehicle. It was assumed that the battery module 10 was initially at 35° C. The averaged heat transfer coefficient (HTC)=800 W/m²−K and the averaged coolant temperature=35° C. applied to all the wetted surfaces in the cold plate 14. Since the cooling units 22 in the model are thermally independent, only the simulation results for the middle cooling unit 22 in the module 10 will be discussed. Because the maximum cell temperatures are encountered at the end of the EV mode, only the simulation results for DOD=0.8 will be discussed.

In a battery thermal management system 12 including cooling plates 26 without a TPG heat spreader 40a, 40b, 40c (and referred to as baseline cooling plate), the simulated maximum differential cell temperature for the battery module 10 may not meet the design criterion (Table 1).

Figure 9:
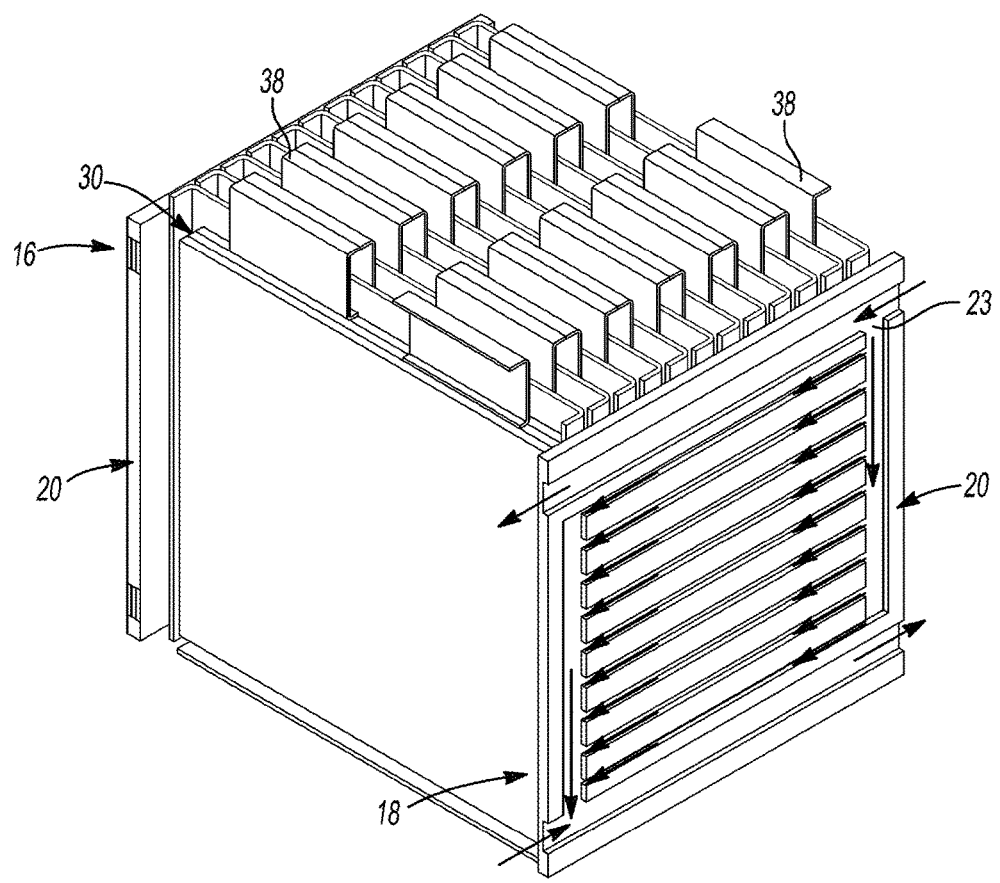
FIG. 9 is a perspective view of the battery pack of FIG. 4 with part of the cold plate removed to show internal components of one of the cold plates.

A battery module 16 was analyzed with dual cold plate cooling under the same electrical and thermal boundary conditions as the module 10 with single cold plate cooling. The cold plate 20 (FIGS. 4, 8, 9) used in the dual cold plate design is the same as that used in the single cold plate design (FIGS. 4, 8, 9). In comparison to the module with single cold plate cooling, the pad side cell temperatures for the cell in the middle cooling unit ($T_{cell,max}$) of the battery module 16 with dual cold plate cooling are reduced from 51.5° C. to 47.5° C. and the differential cell temperature ($\Delta T_{cell,max}$) is reduced from 8.3° C. to 5.6° C., with the temperature reductions of 4.0° C. and 2.7° C., respectively (Table 1).

In a comparison of the predicted temperatures for the cells cooled with the composite cooling plates described in FIGS. 10A-C, the cooling plate 26 with embedded heat spreader 40a spreading over the entire surface of the cooling plate 26 (FIG. 10A, uniform TPG) in contact with the cell 24 may be most effective. In comparison to the cooling plate without TPG heat spreader, for the uniform TPG cooling plate, $T_{cell,max}$ is reduced from 51.5° C. to 49.5° C. and $\Delta T_{cell,max}$ from 8.3° C. to 5.9° C., with the temperature reductions of 2.0° C. and 2.4° C., respectively. For the Π-shaped TPG composite cooling plate (FIG. 10B), $T_{cell,max}$ is decreased by 1.3° C. to 50.2° C. and $\Delta T_{cell,max}$ by 1.5° C. to 6.9° C. For the T-shaped TPG composite cooling plate (FIG. 10C), $T_{cell,max}$ is decreased by 1.0° C. to 50.5° C. and $\Delta T_{cell,max}$ by 1.1° C. to 7.2° C. (Table 1).

The differences in cooling performances for the four cooling plates as well as the baseline cooling plate with dual cold plate cooling are summarized in Table 1; shown below.

TABLE 1

|  | Cooling plate design | | | | |
| --- | --- | --- | --- | --- | --- |
|  | No TPG | No TPG | Uniform TPG | Π-shaped TPG | T-shaped TPG |
| Module cooling design | Single cold plate | Dual cold plate | Single cold plate | Single cold plate | Single cold plate |
| $T_{cell,max}$ ° C. | 51.5 | 47.5 | 49.5 | 50.2 | 50.5 |
| Reduction in $T_{cell,max}$ (%) |  | 4.0 (−8.8%) | 2.0 (−3.9%) | 1.3 (−2.5%) | 1.0 (−1.9%) |
| $\Delta T_{cell,max}$ ° C. | 8.3 | 5.6 | 5.9 | 6.9 | 7.2 |
| Reduction in $\Delta T_{cell,max}$ (%) |  | 2.7 (−32.5%) | 2.4 (−28.9%) | 1.5 (−16.9%) | 1.1 (−9.6%) |

The results show that module 16 with dual cold plate cooling is the most effective in reducing the maximum cell temperature. Under the thermal boundary conditions evaluated, the module 16 with dual cold plate has twice the cooling capability as that with single cold plate. In addition, the proximity of the dual cold plate to the terminal tabs/busbars greatly enhanced the cooling of the terminal tab regions. This results in 4° C. reductions in the maximum cell temperature as compared to that with single cold plate cooling. For the module 10 with single cold plate and cooling plate with uniform TPG (FIG. 10A), the reduction in the maximum cell temperature is 2° C. as compared to the baseline (single cold plate design with cooling plate without TPG). In addition, the reduction in the maximum differential cell temperature is in the same order of magnitude as that with dual cold plate cooling.

For the modules with TPG composite cooling plates, the cell temperature distributions are much more uniform and the high cell temperatures occur only in a small area near the terminal tab for the positive electrode. In comparison, the top 30 percent of the cell is at a high temperature in the case of the cooling plate without TPG. For the three TPG composite cooling plates, there are no significant differences in $T_{cell,max}$. This indicates that $T_{cell,max}$ is governed mostly by the placement of TPG around the terminal tabs area, where it is most effective in redistributing the high local heat fluxes near the terminal tabs 38. The d-section of the heat spreader 40b, 40c influences largely on $\Delta T_{cell,max}$. However, its influence on the uniformity of the cell temperatures is not as strong as the h-section of the heat spreader 40b, 40c. For large pouch cells, a reduction of 1.0° C. in differential cell temperatures can be considered to be significant because it represents a large percentage of $\Delta T_{cell,max}$. In the case of the Π-shaped TPG composite cooling plate (FIG. 10B), the reduction is approximately 17 percent from that of the cooling plate without TPG.

The cell terminal tabs 38 and connection busbars can stand much higher temperatures than the battery cells 24. Very often, the purpose of cooling the terminal tabs/busbars is to mitigate the local cell heating due to the tab/busbar ohmic heat transferred to the cells 24. In the case of single cold plate cooling (FIGS. 3 and 6), the tab/busbar ohmic heat has the longest heat transfer path to the cold plate 14; thus, rapid dissipation of the tab/busbar ohmic heat must be considered for battery cells with large terminal currents as in battery cells for PHEV applications. It is possible to eliminate the need for cooling terminal tabs/busbars when the cells are cooled with the TPG composite cooling plate, as demonstrated in all the three designs of the composite cooling plates (FIGS. 10A-C).

If the criteria for $T_{cell,max}$ and $\Delta T_{cell,max}$ are met, the composite cooling plate can be optimized to minimize the use of TPG material. In general, however, the use of composite cooling plates can be an effective way to reduce temperature gradients in high-power, large-capacity lithium-ion cells for PHEV applications.

In sum, a new composite cooling plate 26, 34 for cooling high-power, large-capacity lithium-ion pouch cells for PHEV applications is provided. This new composite cooling plate consists of an aluminum base plate with strategically incorporated heat spreaders 40a, 40b, 40c made of a superconductivity material like TPG, which is lighter than aluminum and has in-plane thermal conductivity>4 times that of copper. This composite cooling plate can rapidly conduct, spread and dissipate the cell heat to the cooling medium. It improves the uniformity of the cell temperature distribution, reduces the maximum cell temperature and the maximum differential cell temperature, and hence improves the durability of the battery pack with module 10, 16.

Performance of the three composite cooling plate designs (FIGS. 10A-C) was based on cooling of a Li-ion battery module with indirect liquid cooling. The module 10 was stacked with twelve 70 Ah high-power Li-ion pouch cells cooled with the proposed cooling plates 26. The cooling plates 26 served as thermal bridge between the cells 24 and the liquid cooled cold plate 14. The electro-thermal behavior of the thermal management system 12, 18 was simulated using a 3D FEA model for battery cooling under a 3 C continuous discharge current simulating the EV-mode operation of a target LD truck. The simulation results demonstrated that the TPG composite cooling plates improve the uniformity of the cell temperature distributions significantly.

In comparison to the conventional aluminum cooling plate (cooling plate without TPG) with the same geometries, the TPG composite cooling plates can reduce both the maximum cell temperature and the maximum differential cell temperatures. The use of composite cooling plates can mitigate the influences of the tab/busbar ohmic heat on the local cell temperatures near the terminal tabs 38. It can be an effective way in reducing temperature gradients in high-power, large-capacity lithium-ion cells for PHEV applications.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A battery pack comprising:
at least one battery cell; and
at least one cooling plate having a first side disposed adjacent to the at least one battery cell and including thermal pyrolytic graphite (TPG) to dissipate heat away from the at least one battery cell, wherein the TPG is embedded in the at least one cooling plate, the TPG is in direct physical contact with the at least one battery cell, the TPG forms a heat spreader having a substantially pi-shape, and the heat spreader includes a header and a pair of legs extending substantially perpendicularly from the header.

2. The battery pack of claim 1, wherein the TPG is uniformly applied to the at least one cooling plate.

3. The battery pack of claim 1, wherein the at least one battery cell includes a first terminal tab having a first tab width and a second terminal tab having a second tab width, one of the legs of the heat spreader having a first width substantially equal to the first tab width, the other one of the legs of the heat spreader having a second width substantially equal to the second tab width.

4. The battery pack of claim 1, wherein the TPG has a thickness less than or equal to approximately 0.50 millimeters.

5. The battery pack of claim 1, wherein the TPG has a density substantially equal to 2.26 grams per cubic centimeter.

6. The battery pack of claim 1, wherein the at least one cooling plate is formed from aluminum.

7. The battery pack of claim 1, wherein the at least one cooling plate is in contact with at least one cold plate.

8. The battery pack of claim 7, wherein the at least one cold plate is arranged substantially perpendicular to the at least one cooling plate.

9. The battery pack of claim 7, wherein the at least one cold plate includes a liquid circulation path therein.

10. The battery pack of claim 1, wherein the at least one cooling plate is in contact with a first cold plate and a second cold plate.

11. The battery pack of claim 10, wherein the first cold plate is arranged substantially parallel to the second cold plate.

12. The battery pack of claim 1, wherein a second side of the at least one cooling plate is disposed adjacent to an insulating member.

13. The battery pack of claim 12, wherein the insulating member is formed from an elastomeric material.

14. The battery pack of claim 1, wherein the at least one cooling plate has a thickness of approximately 1 millimeter.

15. A method for cooling a battery pack having at least one battery cell, the method comprising:
positioning a cooling plate adjacent to the at least one battery cell, the cooling plate including a thermal pyrolytic graphite (TPG) portion embedded therein, wherein the TPG portion is in direct physical contact with the at least one battery cell, the TPG portion has a substantially pi-shape, and the TPG portion includes a header and a pair of legs extending substantially perpendicularly from the header;
positioning at least one cold plate adjacent and substantially perpendicular to the cooling plate;
circulating a fluid through the at least one cold plate;
transferring heat from the at least one battery cell to the cooling plate;
dissipating the heat through the TPG portion; and
transferring the heat from the cooling plate to the at least one cold plate.

16. The method of claim 15, wherein positioning a cooling plate including a TPG portion includes positioning a cooling plate having a TPG portion that covers more than half of the cooling plate.

17. A battery pack comprising:
at least one battery cell; and
at least one cooling plate having a first side disposed adjacent to the at least one battery cell and including thermal pyrolytic graphite (TPG) to dissipate heat away from the at least one battery cell, wherein:
the TPG is embedded in a base layer of the at least one cooling plate;
the TPG is in direct physical contact with the at least one battery cell; and
a sum of a thickness of the TPG and a thickness of a first portion of the base layer that is covered by the TPG is approximately equal to a thickness of a second portion of the base layer that is not covered by the TPG.

18. The battery pack of claim 1, wherein the at least one battery cell includes a plurality of battery cells, and the at least one cooling plate is disposed between adjacent ones of the plurality of battery cells.

19. The battery pack of claim 1, wherein the heat spreader has an exposed surface facing the at least one battery cell, and the entire exposed surface of the heat spreader is in direct physical contact with the at least one battery cell.

20. The battery pack of claim 17, wherein the second portion of the base layer is also in direct physical contact with the at least one battery cell.

21. The battery pack of claim 17, wherein the TPG has a first surface facing the at least one battery cell, the second portion of the base layer has a second surface facing the at least one battery cell, and the first and second surfaces are substantially coplanar.

\* \* \* \* \*